United States Patent
Craig et al.

(10) Patent No.: US 6,928,421 B2
(45) Date of Patent: Aug. 9, 2005

(54) METHOD AND SYSTEM FOR SECURELY RECORDING A VERBAL TRANSACTION

(75) Inventors: James Craig, Dartmouth (CA); Andrew Osburn, Hammonds Plains (CA); Carter Cockerill, Dartmouth (CA); Jeremy Bernard, Halifax (CA); Mark Boyle, Halifax (CA)

(73) Assignee: diaphonics, Inc., Halifax (CA)

( * ) Notice: Subject to any disclaimer, the term of this patent is extended or adjusted under 35 U.S.C. 154(b) by 562 days.

(21) Appl. No.: 10/005,700

(22) Filed: Dec. 5, 2001

(65) Prior Publication Data

US 2002/0107816 A1 Aug. 8, 2002

(30) Foreign Application Priority Data

Dec. 5, 2000  (CA) ............................................ 2327610

(51) Int. Cl.$^7$ ................................................. H04L 9/00
(52) U.S. Cl. ......................................... 705/67; 380/247
(58) Field of Search ................................ 704/231, 270; 380/257, 247, 277; 455/410; 705/67

(56) References Cited

U.S. PATENT DOCUMENTS

| | | | | |
|---|---|---|---|---|
| 5,937,381 A | | 8/1999 | Huang et al. ................ 704/247 |
| 5,991,617 A | * | 11/1999 | Powell ........................ 455/410 |
| 6,084,967 A | * | 7/2000 | Kennedy et al. ............ 380/247 |
| 6,266,418 B1 | * | 7/2001 | Carter et al. ................ 380/257 |
| 6,308,153 B1 | | 10/2001 | Huang et al. ................ 704/246 |
| 6,704,707 B2 | * | 3/2004 | Anderson et al. ........... 704/231 |
| 2002/0124176 A1 | * | 9/2002 | Epstein ....................... 380/277 |
| 2002/0128844 A1 | * | 9/2002 | Wilson et al. ............... 704/270 |

FOREIGN PATENT DOCUMENTS

WO          WO 8703445 A1 * 6/1987 ........... H04L/11/16

OTHER PUBLICATIONS

"Vasco acquires Digipass s. a., Acquisition of Data security Firm makes Vasco the largest manufacurer of authentication devices." Business Wire, p. 6281033, (Jun. 28, 1999).*

* cited by examiner

*Primary Examiner*—Salvatore Cangialosi
(74) *Attorney, Agent, or Firm*—Pearne & Gordon LLP

(57) ABSTRACT

A method and system for securely recording a verbal transaction, the method including the steps of recording an offer and an acceptance of the transaction as a digital audio file, generating a voice security token from the recorded digital audio file, and providing the generated voice security token to a buyer and/or a seller, wherein the voice security token provides authentication of the transaction. The voice security token is generated by sampling audio frequency and intensity set of the recorded digital audio file and converting the sampled information from a current time domain spectrum to a frequency domain spectrum to condense the sampled information. Finally, a digital file is generated from the condensed information, and encrypted to produce the voice security token.

9 Claims, 5 Drawing Sheets

METHOD AND SYSTEM FOR SECURELY RECORDING A VERBAL TRANSACTION

FIELD OF THE INVENTION

The invention relates generally to commercial transactions, and more particularly to a method and system for securely recording a verbal transaction.

BACKGROUND OF THE INVENTION

Today's businesses operating in the electronic commerce environment have a unique challenge in recording contractual agreements made by voice over electronic appliances such as telephones, personal computers, and wireless devices. While paper documentation has been the traditional method of recording contractual agreements between buyer and seller, paper contracts are incompatible with electronic commerce since the offer and acceptance are usually agreed to entirely within the electronic realm. A paper sales contract will typically involve a buyer providing their signature signifying that they understand and agree to the terms and conditions of the sale. This signed contract then provides a paper-based trail that can form the basis for the non-repudiation of any dispute surrounding the sale. Even for businesses incorporating paper-based processes, the process of reconciliation in the paper environment is expensive due to its inherent people intensive nature.

In electronic voice transactions, there is no effective method of capturing transactional information for the purpose of non-repudiation. Call centers, which commonly receive voice authorizations for goods and services over the telephone, typically either record entire client conversations or do nothing at all. Those that do record client conversations can use the recordings to replay original offer and acceptance portions. For calls of long duration, portions of contractual terms and acceptance of terms and conditions can be captured using Computer Telephony Integration (CTI) systems. However, because of the high costs involved in capturing, storing, and retrieving the correct information from data files, the utilization of CTI systems tends to be limited to less frequent transactions of a higher value. Furthermore, either buyer or seller can easily challenge the authenticity of these non-secure files.

In an attempt to deliver authenticity to the capture of verbal transactions, Electronic Data Interchange (EDI) systems use a Value Added Network (VAN) to assure sender and receiver of the authenticity of a message, and provide all interested parties with tracking tools to ensure messages are received. However, VAN's do not encrypt information, again inviting challenges to an original seller's terms and conditions, or to the acceptance by a buyer. In addition, digital signatures have been gaining greater acceptance in the courts, but are primarily focused on pen-based signatures that utilize biometrics. A Virtual Private Network (VPN) is a trusted medium by which the secure transfer of information between parties can be completed. However, although there is an implicit assumption that buyers and sellers are working in an environment of trust, the need for non-repudiation of verbal contracts remains.

Speech recognition technology enhances the ability to complete more transactions by using voice to augment existing transaction systems. Voice can be transmitted over systems such as Publicly Switched Telephone Systems (PSTN), mobile or cellular traffic, two-way radio, campus systems, and Voice over Internet Protocol (VoIP). While advances in voice recognition technology have taken place, no method exists to capture the nature, intent and agreement surrounding a verbal contract within a voice transaction. What is needed is a simple and inexpensive method for the verification of original verbal contracts within verbal transactions that is difficult to dispute by either buyer or seller.

For the foregoing reasons, there is a need for an improved method of recording a verbal transaction.

SUMMARY OF THE INVENTION

The present invention is directed to a method and system for securely recording a verbal transaction. In accordance with the present invention, there is provided a method for securely recording a verbal transaction, the method including the steps recording an offer and an acceptance of the transaction as a digital audio file, generating a voice security token from the recorded digital audio file, and providing the generated voice security token to buyer and seller, wherein the voice security token provides authentication of the transaction.

In an aspect of the present invention, a third party acts as a neutral party by generating and storing the voice security token, therein providing added integrity to the system.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE PRESENTLY PREFERRED EMBODIMENT

Figure 1:
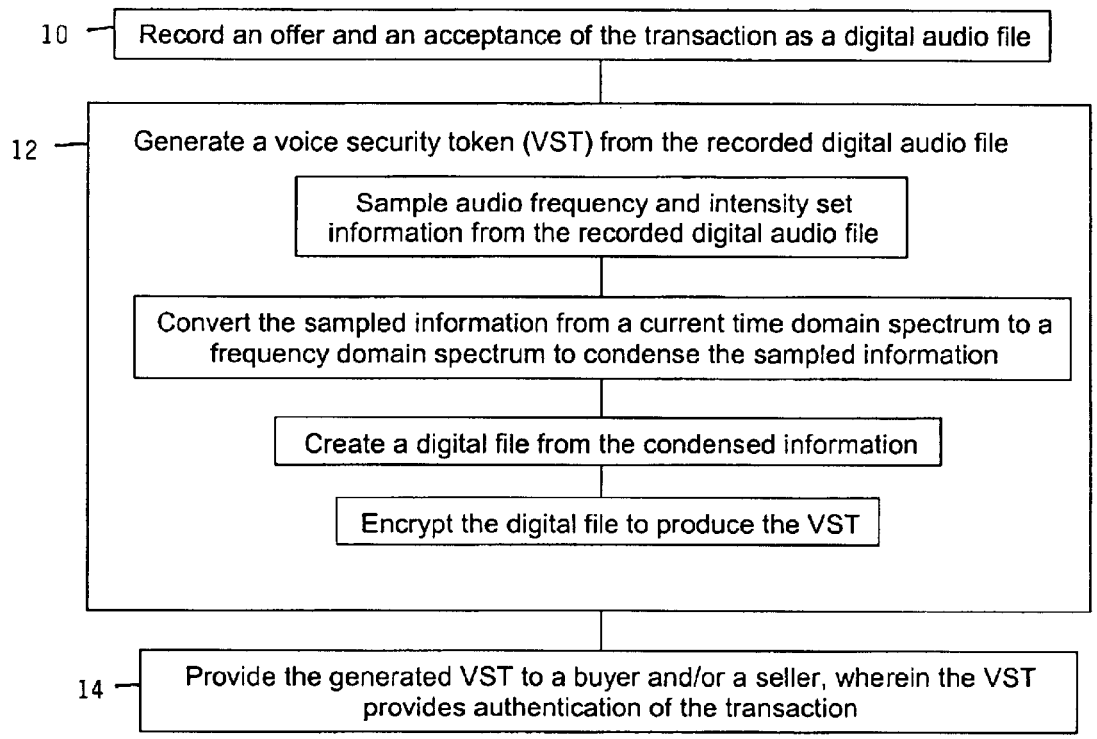
FIG. 1 illustrates a method for securely recording a verbal transaction according to an embodiment of the present invention.

The present invention is directed to a method and system for securely recording a verbal transaction. As shown in FIG. 1, the method includes the steps of recording an offer and an acceptance of the transaction as a digital audio file 10, generating a voice security token from the recorded digital audio file 12, and providing the generated voice security token to buyer and seller, wherein the voice security token provides authentication of the transaction 14.

In an embodiment of the present invention, a third party acts as a neutral party by generating and storing the voice security token, therein providing added integrity to the system.

The invention provides a voice security token (VST) as an assurance mechanism for the buyer and seller of a verbal transaction, ensuring the authenticity of the information for the verification of the original terms and conditions. A VST is a unique transactional identifier that is generated from a digitized voice sample of the buyer and seller, providing a condensed representation of the original voice file, with characteristic voice features of each of the parties in the transaction. The VST is a unique identifier of the specific verbal agreement, and is a 'fingerprint' of the transaction that prevents any modification of the offer and/or acceptance of the terms and conditions that were agreed upon in a verbal contract. Voice security tokens are described further and are the subject of the Applicant's co-pending Canadian patent application serial no. 2,352,001 entitled "Method for Carrier Class Voice Security Token" filed Jun. 29th, 2001.

Figure 2:
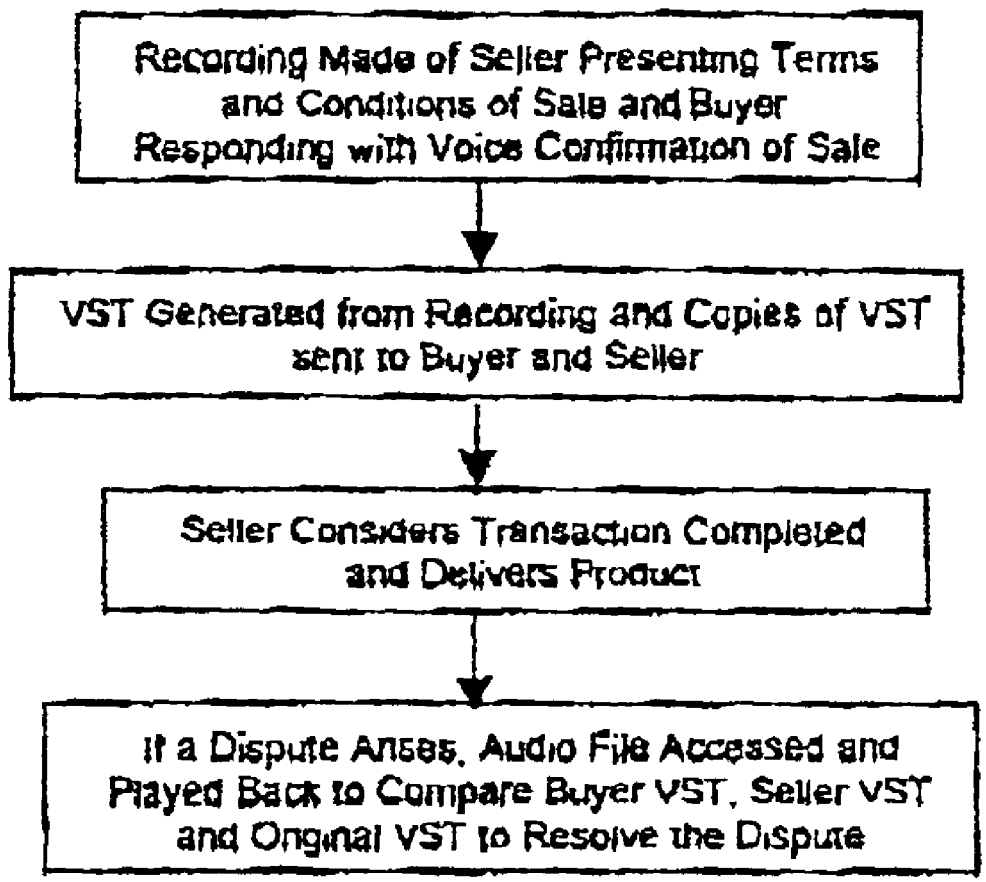
FIG. 2 is a flowchart of a method for securely recording a verbal transaction according to an embodiment of the present invention.
Figure 3:
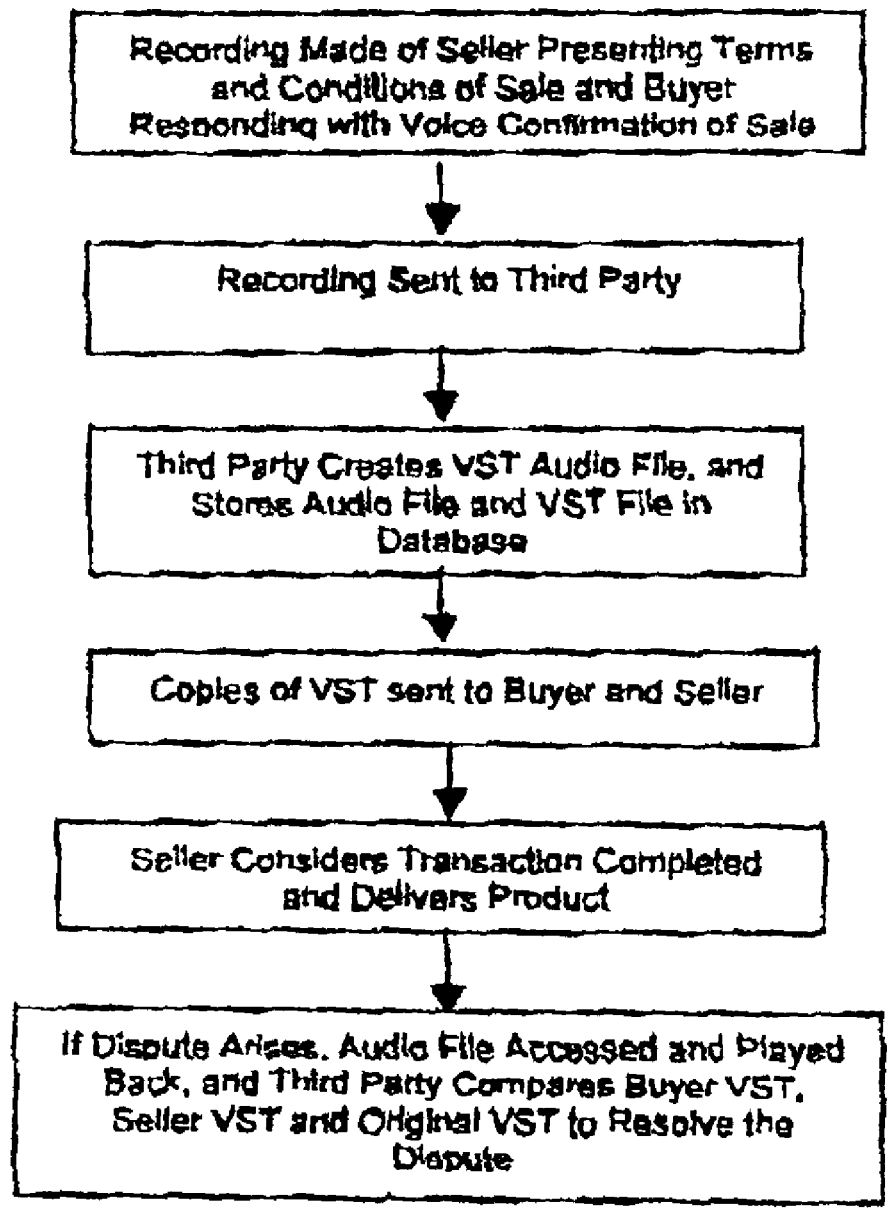
FIG. 3 is a flowchart of a third party embodiment of the present invention.
Figure 4:
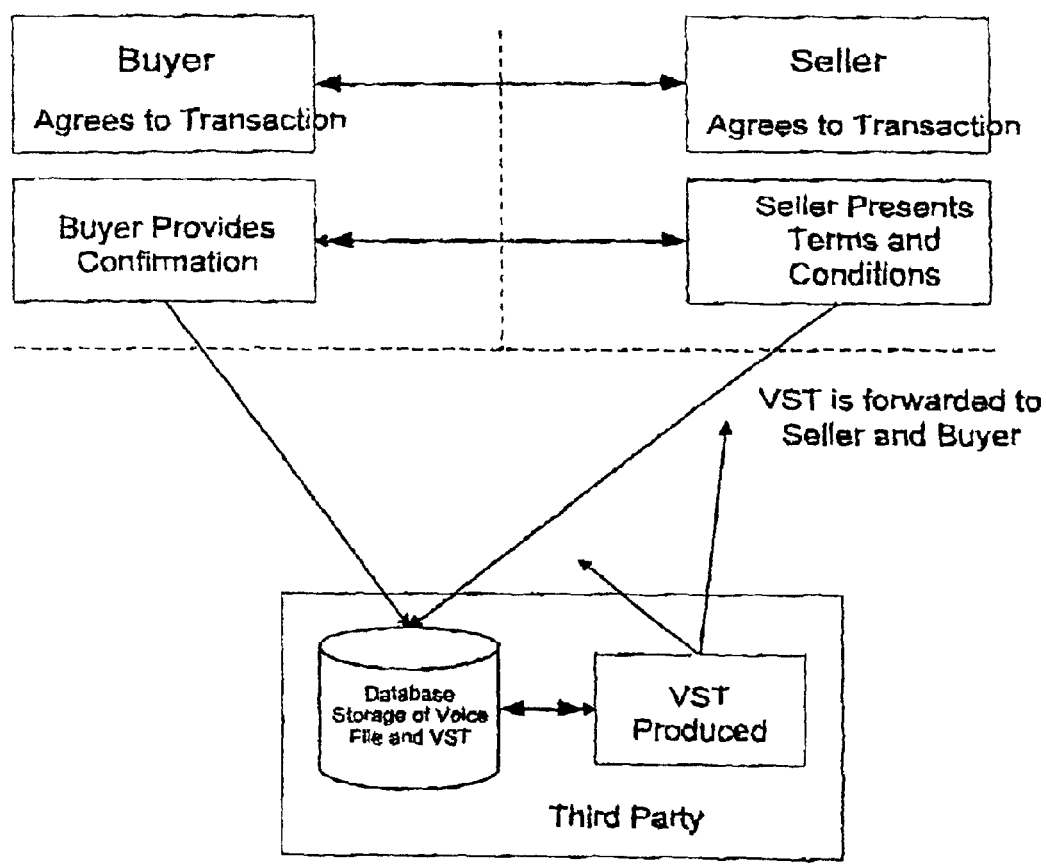
FIG. 4 illustrates the third party embodiment of the present invention.
Figure 5:
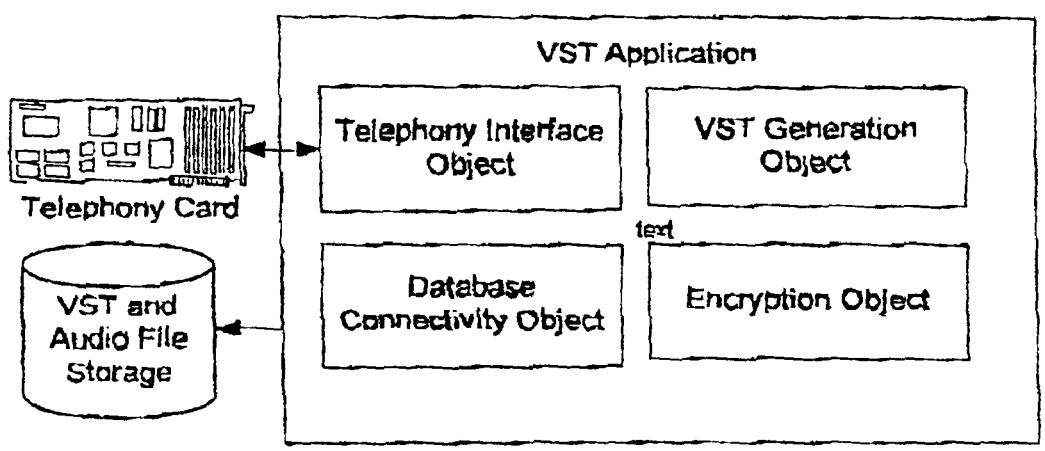
FIG. 5 illustrates components of the system for securely recording a verbal transaction according to an embodiment of the present invention.

As shown in FIG. 2, a seller presents an offer including terms and conditions to a buyer. The buyer receives the offer and then accepts the offer, and an electronic transaction is agreed upon. The offer, including the terms and conditions, and the acceptance of the offer are recorded as a digital audio voice file, with the file then stored in a database. The digital audio voice file is preferably recorded in a time-compatible format. A VST in then created from the audio file and saved in a database along with the audio file. The VST is created where the digital audio file is sent, through a pre-processor program in addition to the core system that features frequency feature extraction. Since voiceprints are unique, the VST is unique for each electronic transaction.

The VST is then sent to both parties by mail receipt, email, fax, XML format, EDI format or any other appropriate format that would be known to those persons skilled in the art. A smaller token can be provided that points to the full version of the VST if either party only requires a condensed confirmation. The seller now goes through their normal process of delivering goods to the customer according to the agreement.

In a preferred embodiment of the present invention, a third party application service provider (ASP) is used as a neutral party for receiving the captured audio files. The ASP then generates a VST, and stores the VST along with the two received original captured audio files in a database in order for either party to have assurances as to the integrity and authenticity of the information. This third party dispute mechanism is limited in human involvement, as either party need simply submit their copy of the VST for access to the authentic originals. Third party participation in the process can lend additional credibility and overall trust as neither buyer nor seller has direct control over the stored transactional data. However, customers may choose to hold the data and infrastructure required to support the VST process themselves, and is also supported with the system.

The process reflects the fact that the VST can be delivered to both parties through some means of communication dependent upon the requirements of the individual circumstances. The system also permits either party to access the stored audio files and/or VST by means of a Voice Interface application and/or through a Web channel. This functionality will allow both parties self-service recall of the voice transaction and VST.

In an embodiment of the present invention, the system can further utilize middleware for integration into business documents. The VST incorporates many features including signal processing methods for analog-to-digital and time-to-frequency conversion, frequency elements for the VST, data storage and hosting, and data encryption. The invention leverages existing login and user level security systems. A voice can be a human voice or a computer generated voice.

In a dispute, a VST is re-generated from the original digital audio files and compared with the presented buyer/seller VST for authentication. In the unlikely event of process tampering, any such tampering of an original voice recording of a contract will be highlighted by the system. If a user has been through an enrolment process, the identity of that user within a transaction can be authenticated utilizing the VST, or can be matched after the fact by comparing a provided voice sample. The invention can be used to enable a buyer and/or seller to utilize their own assurance systems for capturing the information.

The VST ensures the authenticity of a seller's original offer and a buyer's acceptance. By being situated at the individual level versus the company level, the VST can be used by either the buyer or the seller or from a third party so that it creates an assurance mechanism based on the user's own voice, and within the contractual agreement itself. The VST forms the basis for any non-repudiation claims if the buyer or seller disputes the terms and conditions.

The invention is not limited to confirmation of verbal contracts, but can be utilized to augment traditional paper contracts as well. Since a VST is given to both parties and must match to ensure the validity of the originals, the invention provides a mechanism for ensuring a high degree of confidence that records of an offer and acceptance have not been tampered with. The small file size of the VST when compared to standard voice files enables it to be easily embedded within business transactions.

The VST provides a high degree of protection because it is unique for each transaction, and because it prevents the duplication of a VST without access to the original information. Since the invention is based on database architecture speeds as compared with human intervention, it provides a faster method of non-repudiation challenges as compared to traditional methods. Furthermore, the VST is lower in cost than traditional methods due to its limited human intervention.

Although the present invention has been described in considerable detail with reference to certain preferred embodiments thereof, other versions are possible. Therefore, the spirit and scope of the appended claims should not be limited to the description of the preferred embodiments contained herein.

What is claimed is:

1. A method of securely recording a verbal transaction, the method comprising the steps of:
   (i) recording an offer and an acceptance of the transaction as a digital audio file;
   (ii) generating a voice security token (VST) from the recorded digital audio file, including the steps of:
      a) sampling audio frequency and intensity set information from the recorded digital audio file;
      b) converting the sampled information from a current time domain spectrum to a frequency domain spectrum to condense the sampled information;
      c) creating a digital file from the condensed information; and
      d) encrypting the digital file to produce the VST; and
   (iii) providing the generated VST to a buyer and/or a seller, wherein the VST provides authentication of the transaction.

2. The method according to claim 1, wherein a third party acts as a neutral party by generating and storing the VST, therein providing added integrity.

3. The method according to claim 1, further including the step of permitting either party to access the stored audio file and/or VST by means of a Voice Interface application and/or through a Web channel to enable either party self-service recall of the voice transaction and the VST.

4. A system for securely recording a verbal transaction, the system comprising:
- a recorder for recording an offer and an acceptance of the transaction as a digital audio file;
- a generator for generating a voice security token (VST) from the recorded digital audio file, the generator including:
  - a sampler for sampling audio frequency and intensity set information from the recorded digital audio file;
  - a converter for converting the sampled information from a current time domain spectrum to a frequency domain spectrum to condense the sampled information;
  - a creator for creating a digital file from the condensed information; and
  - an encryptor for encrypting the digital file to produce the VST; and
- a provider for providing the generated VST to a buyer and/or a seller, wherein the VST provides authentication of the transaction.

5. The system according to claim 4, wherein a third party acts as a neutral party by generating and storing the VST, therein providing added integrity.

6. The system according to claim 4, where the system also permits either party to access the stored audio file and/or VST by means of a Voice Interface application and/or through a Web channel to enable either party self-service recall of the voice transaction and the VST.

7. A storage medium readable by a computer, the medium encoding a computer process to provide a method for securely recording a verbal transaction, the computer process comprising:
- a processing portion for recording an offer and an acceptance of the transaction as a digital audio file;
- a processing portion for generating a voice security token (VST) from the recorded digital audio file including:
  - a processing portion for sampling audio frequency and intensity set information from the recorded digital audio file;
  - a processing portion for converting the sampled information from a current time domain spectrum to a frequency domain spectrum to condense the sampled information;
  - a processing portion for creating a digital file from the condensed information; and
  - a processing portion for encrypting the digital file to produce the VST; and
- a processing portion for providing the generated VST to a buyer and/or a seller, wherein the VST provides authentication of the transaction.

8. The medium according to claim 7, further including a processing portion for generating and storing the VST, with a third party acting as a neutral party, therein providing added integrity.

9. The medium according to claim 7, further including a processing portion for either party to access the stored audio file and/or VST by means of a Voice Interface application and/or through a Web channel to enable either party self-service recall of the voice transaction and the VST.

* * * * *